United States Patent
Lim et al.

(10) Patent No.: US 11,086,407 B2
(45) Date of Patent: Aug. 10, 2021

(54) DEVICE WITH A KEYPAD THAT INCLUDES A BEZEL ASSEMBLED WITH A FLEXIBLE SUBSTRATE

(71) Applicant: MOTOROLA SOLUTIONS, INC., Chicago, IL (US)

(72) Inventors: Sze Yen Lim, Georgetown (MY); Wan Mohd Ariff Wan Sulaiman, Simpang Ampat (MY); Chi Meng Khong, Bayan Lepas (MY); Boon Aik Eeo, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 54 days.

(21) Appl. No.: 16/597,982

(22) Filed: Oct. 10, 2019

(65) Prior Publication Data
US 2021/0109601 A1  Apr. 15, 2021

(51) Int. Cl.
| | |
|---|---|
| *H01H 13/70* | (2006.01) |
| *G06F 3/02* | (2006.01) |
| *G06F 3/0488* | (2013.01) |
| *H01H 9/02* | (2006.01) |
| *H01H 13/7065* | (2006.01) |

(52) U.S. Cl.
CPC ........ *G06F 3/0202* (2013.01); *G06F 3/04886* (2013.01); *H01H 9/0235* (2013.01); *H01H 13/7065* (2013.01); *H01H 2209/01* (2013.01)

(58) Field of Classification Search
None
See application file for complete search history.

(56) References Cited

U.S. PATENT DOCUMENTS

| | | | |
|---|---|---|---|
| 4,387,718 A * | 6/1983 | Bilitz | A61N 1/00 607/63 |
| 5,514,319 A | 5/1996 | Young | |
| 6,423,171 B1 | 7/2002 | Yang | |
| 6,824,321 B2 | 11/2004 | Ward et al. | |
| 7,071,434 B1 * | 7/2006 | McConnell | H01H 13/83 200/310 |
| 7,322,759 B2 * | 1/2008 | Rak | G06F 3/0219 400/486 |
| 7,334,067 B2 * | 2/2008 | Brown | H01H 13/70 710/5 |
| 7,348,512 B2 | 3/2008 | Iohara | |
| 7,897,888 B2 * | 3/2011 | Dimig | H01H 9/0235 200/302.2 |

(Continued)

*Primary Examiner* — Felix O Figueroa
(74) *Attorney, Agent, or Firm* — Perry + Currier, Inc.

(57) ABSTRACT

A device with a keypad that includes a bezel assembled with a flexible substrate is provided. The bezel comprises: a first aperture and a second aperture separated by a retention plate. The flexible substrate comprises two or more arms joined at joining ends, and separated at distal ends, distal from the joining ends; at least one arm, of the two or more arms, comprises: a first button portion and a second button portion configured to respectively mate with the first aperture and the second aperture from a rear-side of the bezel, the first button portion and the second button portion separated by a non-button portion. The flexible substrate may be assembled with the bezel to form the keypad by inserting a distal end of the one or more arms through the first aperture from the rear-side of the bezel.

19 Claims, 6 Drawing Sheets

(56) References Cited

U.S. PATENT DOCUMENTS

| | | | |
|---|---|---|---|
| 8,212,166 B2* | 7/2012 | Yeh | H01H 13/52 |
| | | | 200/341 |
| 8,326,377 B2* | 12/2012 | Cho | H01H 13/704 |
| | | | 455/575.1 |
| 8,446,713 B2* | 5/2013 | Lai | H01H 13/86 |
| | | | 361/679.02 |
| 8,492,666 B2* | 7/2013 | Chen | H01H 13/76 |
| | | | 200/5 B |
| 2019/0287743 A1* | 9/2019 | Wisniewski | H01H 13/7057 |

* cited by examiner

DEVICE WITH A KEYPAD THAT INCLUDES A BEZEL ASSEMBLED WITH A FLEXIBLE SUBSTRATE

BACKGROUND OF THE INVENTION

Some portable devices, such as remote speaker microphones (RSMs), and the like, may include a keypad that includes several buttons. Such keypads may generally include flexible portions of the keypad bonded to rigid portions, and with actuatable buttons of the portable device under areas of the flexible portions. Such keypads may be costly as they may be built using two types of materials bonded together, (e.g. a hard material bonded to a soft material during the manufacture process), which can lead to high cost and poor yield.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some portable devices, such as remote speaker microphones, and the like, may include a keypad that includes several buttons. Such keypads may generally include flexible portions of the keypad bonded to rigid portions, and with actuatable buttons of the portable device under areas of the flexible portions. Such keypads may be costly as they may be built using two types of materials bonded together, (e.g. a hard material bonded to a soft material during the manufacture process), which can lead to high cost and poor yield. In particular a keypad on such portable devices should generally be rugged and furthermore ergonomically intuitive for a user to manipulate; in other words, such keypads may be provided in a manner that reduces a chance of a user having to guess where to press and/or actuate a button. Indeed, such problems may be particularly acute for portable devices used by first responders, such as remote speaker microphones, and the like. Furthermore, such keypads should be easy to assemble to reduce cost and improve yield.

Hence, provided herein is a device that includes a bezel and a flexible substrate. may be provided as separate pieces (e.g. manufactured independent of each other) and assembled to form a keypad. The bezel includes a first aperture and a second aperture separated by a retention plate which may provide a hard surface against which a user may attempt to interact, and which indicates that the retention plate does not correspond to a button (e.g. when the bezel and the flexible substrate are assembled). The flexible substrate includes at least two arms, one of which includes two button portions separated by a non-button portion; the button portions mate with the two apertures of the bezel from a rear-side of the bezel while the non-button portions resides against the retention plate at a front-side of the bezel. The flexible substrate may be assembled with the bezel by: inserting a distal end of the arm that includes the two button portions through the first aperture from the rear-side of the bezel, over the retention plate, and through the second aperture, for example in a weaving pattern and/or an over-and-under motion. Other arms of the flexible substrate may mate with the bezel from the rear-side (e.g. via other apertures in the bezel), with the arm with the two button portions assisting with holding the flexible substrate in place at the bezel. In some examples the button portions include rims which may be retained against a rear-side of the bezel using a mechanical retention mechanism, which may assist with keeping moisture, and the like, out of the device. Hence, the presently provided device may be relatively easy to assemble, rugged and ergonomically intuitive for a user to manipulate.

An aspect of the specification provides a comprising: a bezel comprising: a first aperture and a second aperture separated by a retention plate; and a flexible substrate comprising two or more arms joined at joining ends, and separated at distal ends, distal from the joining ends, at least one arm, of the two or more arms: comprising: a first button portion and a second button portion configured to respectively mate with the first aperture and the second aperture from a rear-side of the bezel, the first button portion and the second button portion separated by a non-button portion, a distal end of the at least one arm configured for: insertion through the first aperture from the rear-side of the bezel, over the retention plate, and insertion through the second aperture from a front-side of the bezel, such that the first button portion and the second button portion respectively mate with the first aperture and the second aperture from the rear-side of the bezel, and the non-button portion resides against the retention plate from the front-side of the bezel, and remaining arms, of the two or more arms, mating with the bezel from the rear-side.

Figure 1:
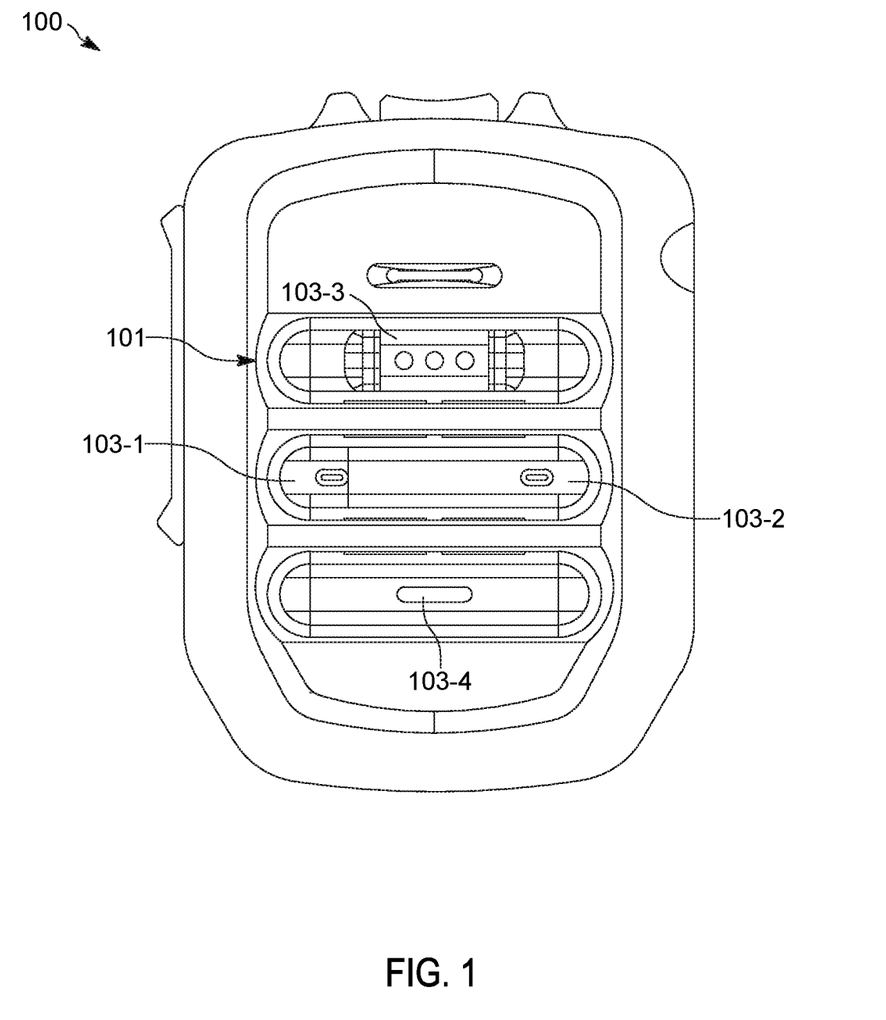
FIG. 1 is a device with a keypad that includes a bezel assembled with a flexible substrate, in accordance with some examples.

Attention is directed to FIG. 1 which depicts a front view of a device 100 that includes a keypad 101. As depicted the device 100 comprises a remote speaker microphone (and/or a radio speaker microphone), however the device 100 may comprise any suitable portable communication device which may incorporate the keypad 101, as described hereafter. In some examples, the device 100 may comprise a body wearable device (such as an RSM and/or another body wearable device). In particular example, the device 100 may comprise a shoulder mountable wearable device (such as an RSM and/or another shoulder mountable wearable device). Indeed, in some of these examples, the device 100 may be used in situations where the keypad 101 is not viewable by a user of the device 100. Hence, detection of buttons of the device 100 by a user, without the user having to directly view the device 100, may be important, especially for public safety personnel and/or first responders, and the like.

In particular, the keypad 101 comprises a four button keypad that includes buttons 103-1, 103-2, 103-3, 103-4 (interchangeably referred to hereafter, collectively, as the buttons 103 and, generically, as a button 103). The buttons 103 may be used to control the device 100 and/or a second device (e.g. a radio device) connected to the device 100 (e.g. when the device 100 comprises an RSM). While four buttons 103 are depicted, the keypad 101 may include any suitable number of buttons; however, as will be described hereafter, the keypad 101 may comprise at least the buttons 103-1, 103-2.

As depicted, the buttons 103 are arranged in three rows: the buttons 103-1, 103-2 are in a middle row, the button 103-3 is in a top row, and the button 103-4 is in a bottom row. Regions of the rows that do not correspond to buttons are not actuatable. While buttons 103 are arranged in three rows, the buttons 103 may be arranged in as few as one row (e.g. a row that includes the buttons 103-1, 103-2), two rows, and/or more than three rows. Furthermore, while the buttons 103-1, 103-2 are depicted as being in the middle row, the buttons 103-1, 103-2 may be in the top row and/or the bottom row and/or any other suitable row. Furthermore, while the each of the top and bottom rows include one button 103, one or more of the top and bottom row may alternatively include two respective buttons 103 that are formed in a manner similar to the buttons 103-1, 103-2. Components of the keypad 101 are next described.

Figure 2:
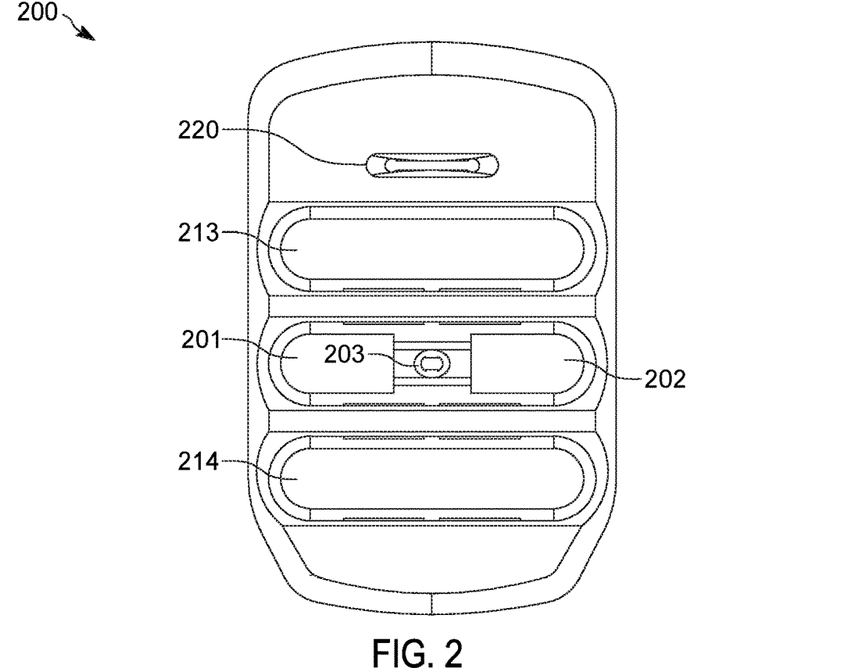
FIG. 2 depicts the bezel of the device of FIG. 1, in accordance with some examples.

Attention is next directed to FIG. 2 which depicts a bezel 200 of the keypad 101, disassembled from the device 100 and/or the keypad 101. The bezel 200 may be formed from any suitable hard material, such as a hard plastic, and the like. The bezel 200 comprises a first aperture 201 and a second aperture 202 separated by a retention plate 203. The apertures 201, 202 and the retention plate 203 correspond to the second row of the buttons 103 of the keypad 101. Indeed, the first aperture 201 corresponds to a position of the first button 103-1 and the second aperture 202 corresponds to a position of the second button 103-2. As will be described below, the retention plate 203 is generally rigid and may provide a hard surface against which a user of the device 100 may attempt to press and which indicates that no button 103 is provided at this position (e.g. which may reduce a chance of a user having to guess where to press and/or actuate a button 103-1, 103-2).

As depicted, the bezel 200 comprises further apertures 213, 214 which respectively correspond to the top row of the keypad 101 and the bottom row of the keypad 101. As such, the buttons 103-3, 103-4 may correspond to regions of the apertures 213, 214.

The bezel 200 may further be configured to mate with a body of the device 100, for example via any suitable mating mechanism (e.g., latches, and the like) such that the keypad 101 may be assembled and attached to the device 100, for example via an aperture of the device 100.

The bezel 200 may further include other components and/or features, for example, as depicted, a speaker/microphone aperture and/or grill 220, and the like, corresponding to a position of a speaker and/or microphone of the device 100.

Figure 3:
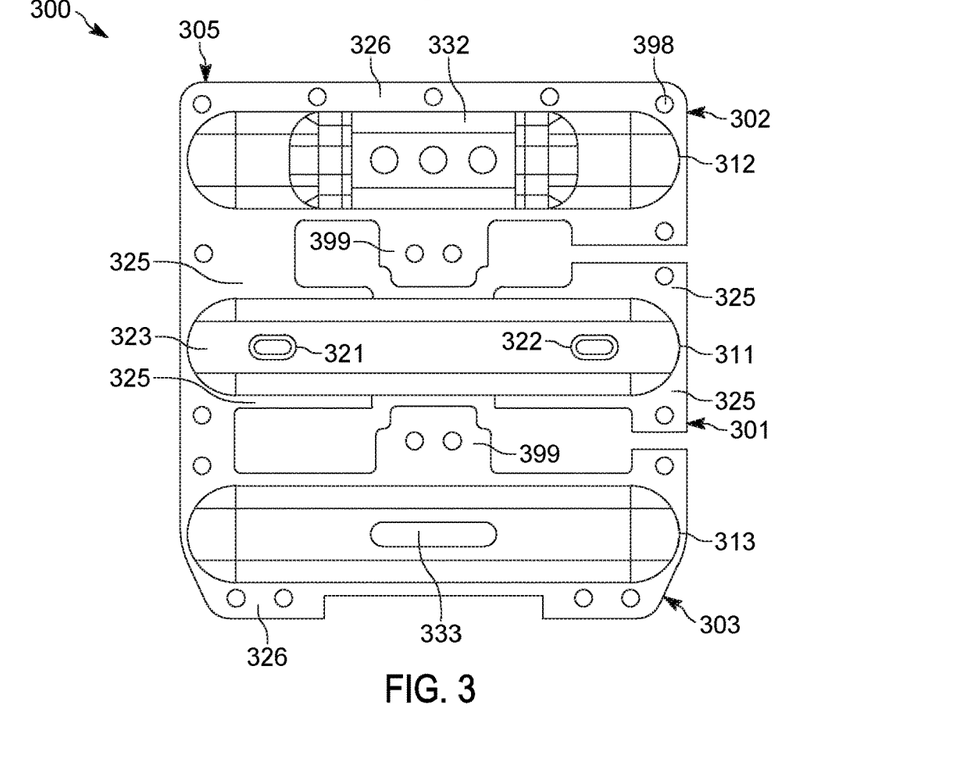
FIG. 3 depicts the flexible substrate of the device of FIG. 1, in accordance with some examples.

Attention is next directed to FIG. 3 which depicts a flexible substrate 300 of the keypad 101, disassembled from the device 100 and/or the keypad 101. The flexible substrate 300 is generally flexible and may be formed from any suitable flexible material, such as a flexible plastic, silicone, rubber, and the like. However, in some examples, flexible substrate 300 may be made from rubber and in particular rubber without silicone (e.g. as used when manufacturing prior art keypads using liquid silicone injection molding manufacturing techniques).

As depicted, the flexible substrate 300 comprises two or more arms 301, 302, 303 joined at respective joining ends 305, and separated at respective distal ends 311, 312, 313. The distal ends 311, 312, 313 are generally distal from the respective joining ends 305.

As depicted, the flexible substrate 300 comprises three arms 301, 302, 303 joined at the joining ends 305, and separated at the distal ends 311, 312, 313, such that the flexible substrate 300 has an "E" shape. The arms 301, 302, 303 may further be separated by spaces and/or voids there between (e.g. between the arms 301, 302, 303 of the "E"). As will be described hereafter, the arm 301 is configured to mate with the apertures 201, 202 of the bezel 200, while the arms 302, 303 are configured to respectively mate with the apertures 213, 214 of the bezel 200.

In particular, the arm 301, of the two or more arms 301, 302, 303, generally comprises: a first button portion 321 and a second button portion 322 configured to respectively mate with the first aperture 201 and the second aperture 202 from a rear-side of the bezel 200, the first button portion 321 and the second button portion 322 separated by a non-button portion 323. For example, when the flexible substrate 300 is assembled with the bezel 200, the first button portion 321 and the second button portions 322 respectively extend through the apertures 213, 214 from a rear-side of the bezel 200, with the non-button portion 323 residing on the retention plate 203 at a front-side of the bezel 200. However, the button portions 321, 322 and the non-button portion 323 may form a continuous surface across a front-side of the arm 301, as described below.

In some examples, the keypad 101 (and/or the device 100) may further comprise a retention mechanism for retaining the non-button portion 323 against the retention plate 203. For example, the retention plate 203 may include ridges, and the like, which mate with complementary ridges, and the like at a rear-side of the non-button portion 323. However, any suitable retention mechanism is within the scope of the present specification, and the non-button portion 323 may be retained against the retention plate 203 in any suitable manner.

The first button portion 321 and the second button portions 322 respectively correspond to positions of the buttons 103-1, 103-2. Put another way, when the keypad 101 is assembled and attached to the device 100, the first button portion 321 and the second button portion 322 provide a flexible surface with which a user of the device 100 may interact to actuate the buttons 103-1, 103-2; it is further understood that the buttons 103-1, 103-2 of the device 100 include respective button actuators, and the like, located behind the first button portion 321 and the second button portion 322 when the keypad 101 is assembled and attached to the device 100 (e.g. such button actuators may be located within the device 100 and not the keypad 101).

As depicted, the first button portion 321 and the second button portion 322 comprise respective protrusions from a front surface thereof, indicative of respective button positions; for example the respective protrusions may provide a tactile indication of the positions of the buttons 103-1, 103-2, which may assist a user with locating the buttons 103-1, 103-2.

Furthermore, as depicted, the arm 301 comprises respective rims 325 around respective sections of the first button portion 321 and the second button portion 322, the respective rims 325 configured to reside against the rear-side of the bezel 200 when the first button portion 321 and the second button portion 322 respectively mate with the first aperture 201 and the second aperture 202 from the rear-side of the bezel 200. The respective rims 325 are not around the non-button portion 323. When the flexible substrate 300 is assembled with the bezel 200, the rims 325 may be mechanically retained against the rear-side of bezel 200, as described below, to assist with keeping moisture, and the like, out of the device 100.

Mating of the arm 301 with the apertures 201, 202 is described below. However, the remaining arms 302, 303 (e.g. of the two or more arms 301, 302, 303) are configured to mated with the bezel 200 from rear-side of the bezel 200, also described below.

While the flexible substrate 300 is depicted as having three arms 301, 302, 303, arranged in an "E" shape, in other examples, the flexible substrate 300 may have as few as two arms, including: the arm 301, configured to mate with the apertures 201, 202; and at least another arm which may be the same as, or different from, the arms 302, 303, The number of remaining arms may depend on a number of apertures at the bezel 200. For example, when the bezel 200 has one additional aperture (e.g. one of the apertures 213, 214), in addition to the apertures 201, 202, the flexible substrate 300 may have one additional arm (e.g. one of the arms 302, 302) configured to mate with the one additional aperture, and the flexible substrate 300 may be in a "C" shape.

Hence, in some examples (e.g. as depicted), the bezel 200 may comprise the further apertures 213, 214 in a one-to-one relationship with the remaining arms 302, 303, the remaining arms 302, 303 comprising respective button portions 332, 333 configured to mate with respective apertures, of the further apertures 213, 214, from a rear-side of the bezel 200.

When the bezel has no additional apertures, for example other than the apertures 201, 202, the flexible substrate 300 may include one additional arm (e.g. in addition to the arm 301) which mates with the rear-side of the bezel 200 to provide stability to the mating of the flexible substrate 300 with the bezel 200 but does not correspond to a button 103. The flexible substrate 300 may hence comprise any suitable shape which may depend on a number of buttons 103 of the keypad 101.

The button portions 332, 333 respectively correspond to positions of the buttons 103-3, 103-4. Put another way, when the keypad 101 is assembled and attached to the device 100, the button portions 332, 333 provide a flexible surface with which a user of the device 100 may interact to actuate the buttons 103-3, 103-4; it is further understood that the buttons 103-3, 103-4 include respective button actuators, and the like, located behind the button portions 332, 333 when the keypad 101 is assembled and attached to the device 100 (e.g. such button actuators may be located within the device 100 and not the keypad 101). The device 100 may further comprise hard surfaces located behind the remainder of the arms 302, 303 outside of the button portions 332, 333 and against which a user of the device 100 may attempt to press and which indicates that no button 103 is provided at this position (e.g. which may reduce a chance of a user having to guess where to press and/or actuate a button 103-3, 103-4).

Furthermore, the button portions 332, 333 may also include respective protrusions from a front surface thereof, indicative of respective button positions; for example the respective protrusions may provide a tactile indication of the positions of the buttons 103-3, 103-4, which may assist a user with locating the buttons 103-3, 103-4.

Furthermore, it is understood that the arms 302, 303 comprise rims 326 similar to the rims 325 and in particular may be around the perimeter of the arms 302, 303 irrespective of buttons portions 332, 333 (e.g. described below. When the flexible substrate 300 is assembled with the bezel 200, the rims 326 may be mechanically retained against the rear-side of bezel 200, as described below, to assist with keeping moisture, and the like, out of the device 100.

In some examples, the keypad 101 and/or the device 100 may comprise one or more retention mechanisms for retaining the two or more arms 301, 302, 303 at the rear-side of the bezel 200. For example, as depicted in FIG. 3, the flexible substrate 300 may comprise holes 398, and the like, for example in the rims 325, 326, corresponding to positions of respective posts (not visible in FIG. 2 or FIG. 3) extending from a rear-side of the bezel 200; the holes 398 may be placed over the respective posts, with the flexible substrate 300 sliding over the respective posts so that the respective posts extend through the holes 398. While for simplicity only one hole 398 is numbered in FIG. 3, it is apparent that the flexible substrate 300 comprises a plurality of holes 398, for example through the rims 325, 326 of the arms 301, 302, 303. It is further understood from FIG. 3 that the arms 302, 303 (may include respective tabs 399 that extend from respective rims 326 towards the first arm 301 (e.g. in respective spaces between the arms 301, 302, 303) that include the holes 398 which mate with respective posts of the bezel 200; such holes 398 in the tabs 399 mating with respective posts of the bezel 200 may provide further stability to the arms 302, 303, and/or increase ruggedness of the keypad 101, when the keypad 101 is in an assembled state.

Furthermore, while the remaining arms 302, 303 are depicted as being different from the arm 301, in other examples, at least one of the remaining arms 302, 303 may have a same and/or similar configuration as the arm 301, and the bezel 200, in these examples, may comprise respective apertures (e.g. similar to the apertures 201, 202) for a respective first button portion and a respective second button portion (e.g. of at least one of the remaining arms 302, 303 that have a same and/or similar configuration as the arm 301), separated by a respective retention plate (e.g. similar to the retention plate 203), for mating with the at least one of the remaining arms 302, 303 that have a same and/or similar configuration as the arm 301. Indeed, any number buttons 103 of the device 100 and/or the keypad 101 may be formed in a manner similar to the buttons 103-1, 103-2, with the arms of the flexible substrate 300, and the apertures of the bezel 200 adapted accordingly.

A process for assembling the keypad 101 (and/or the device 100) is next described. In particular, the distal end 311 of the arm 301 is configured for: insertion through the first aperture 201 from the rear-side of the bezel 200, over the retention plate 203, and insertion through the second aperture 202 from a front-side of the bezel 200, such that the first button portion 321 and the second button portion 322 respectively mate with the first aperture 201 and the second aperture 202 from the rear-side of the bezel 200, and the non-button portion 323 resides against the retention plate 203 from the front-side of the bezel 200.

Figure 4:
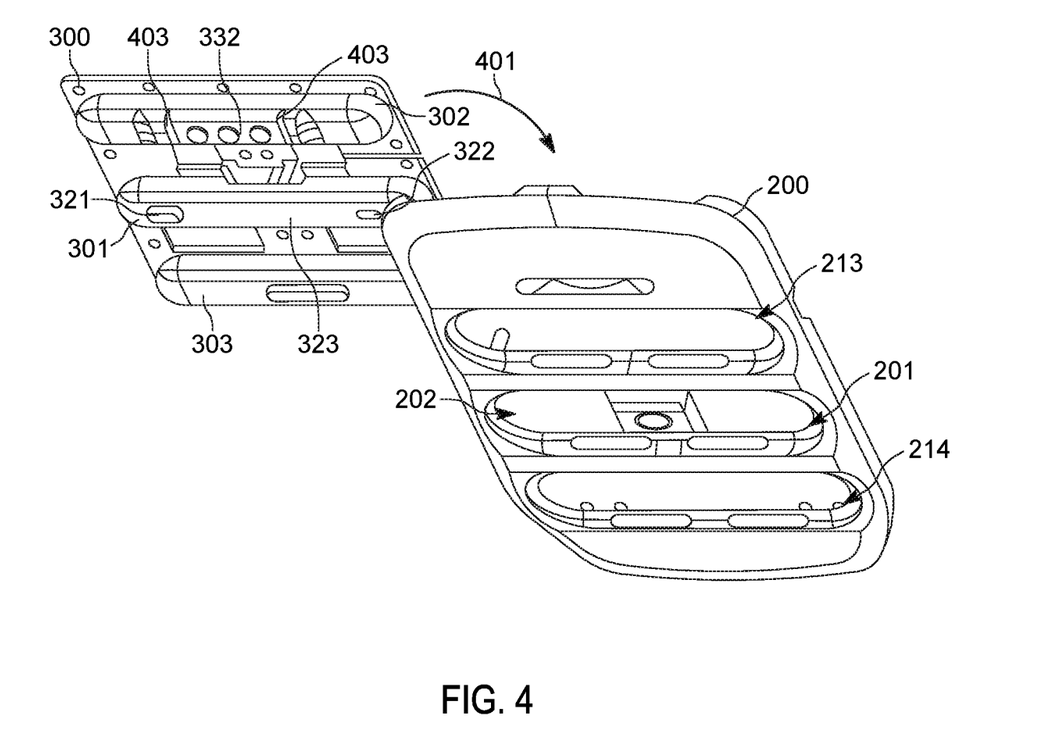
FIG. 4 depicts a perspective view of the bezel and the flexible substrate of the device of FIG. 1, in an unassembled state, in accordance with some examples.

For example, with attention next directed to FIG. 4, the flexible substrate 300 may be placed adjacent the rear-side of the bezel 200 as indicated by the arrow 401, with the arm 301 placed adjacent the aperture 201 and the arms 302, 303 placed adjacent the respective apertures 213, 214. The perspective at which the flexible substrate 300 is depicted in FIG. 4 further shows that a front surface of the arm 301 comprises a continuous surface across the first button portion 321, the non-button portion 323 and the second button portion 322 (e.g. other than the tactile protrusions). However, such a continuous surface is optional, and the front surface of the arm 301 may include grooves, and the like, indicating separations between the first button portion 321, the non-button portion 323 and the second button portion 322. Indeed, as depicted, the front surface of the arm 302 includes such grooves 403 on either side of the button portion 332; the device 100 may hence comprise hard surfaces on either side of the grooves 403 (e.g. outside of the button portion 332) to assist a user with locating the button 103-3.

Figure 5:
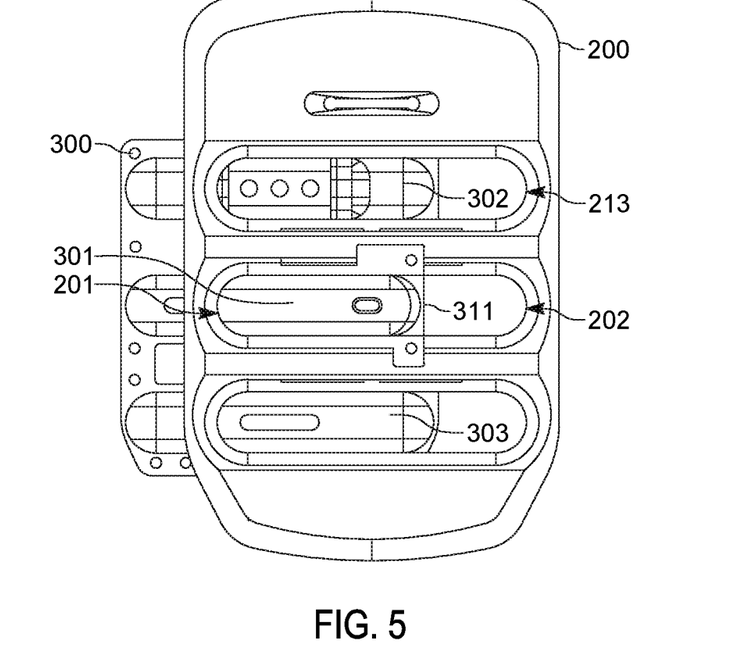
FIG. 5 depicts a front view of the bezel and the flexible substrate of the device of FIG. 1, in a partially assembled state, in accordance with some examples.
Figure 6:
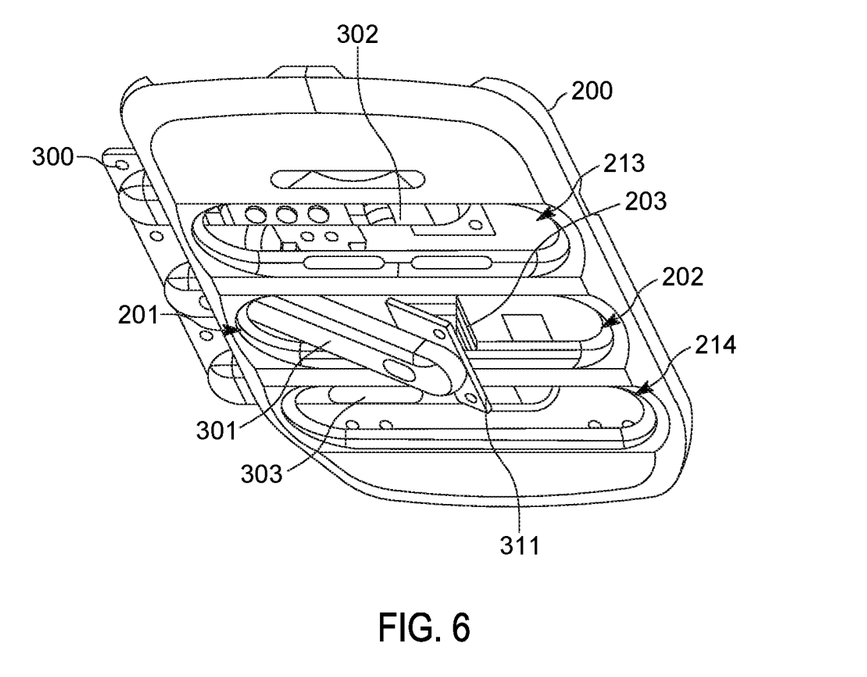
FIG. 6 depicts a perspective view of the bezel and the flexible substrate of the device of FIG. 1, in the partially assembled state, in accordance with some examples.

Attention is next directed to FIG. 5 and FIG. 6 which respectively depict front and perspective views of the bezel 200 and the flexible substrate 300, in a partially assembled state. In particular, the distal end 311 of the arm 301 has been inserted through the first aperture 201 from a rear-side of the bezel 200 and over the retention plate 203. As best seen in FIG. 6, the distal end 311 may at least temporarily extend out of the aperture 201 over the retention plate 203. Furthermore, the arms 302, 303 have been moved further adjacent the respective apertures 213, 214 from the rear-side of the bezel 200, but are not yet fully aligned with the apertures 213, 214.

Figure 7:
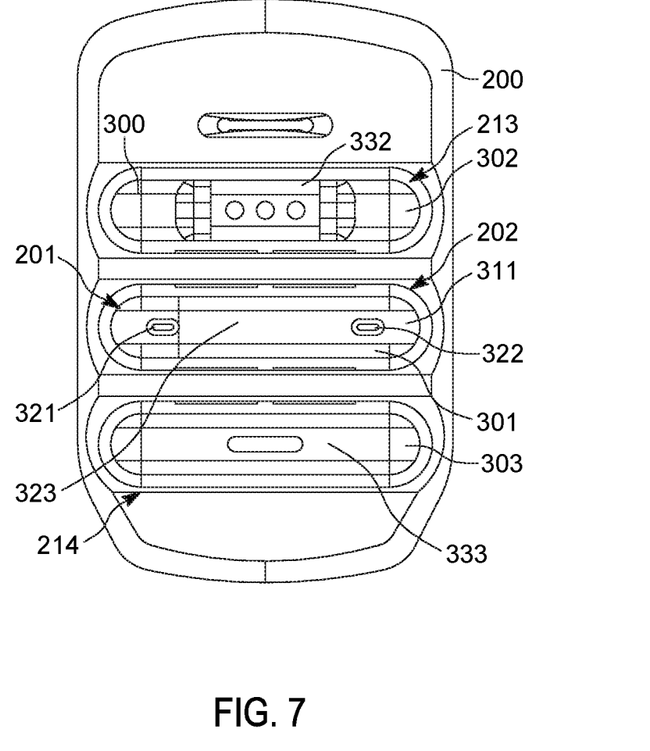
FIG. 7 depicts a front view of the bezel and the flexible substrate of the device of FIG. 1, in an assembled state, in accordance with some examples.
Figure 8:
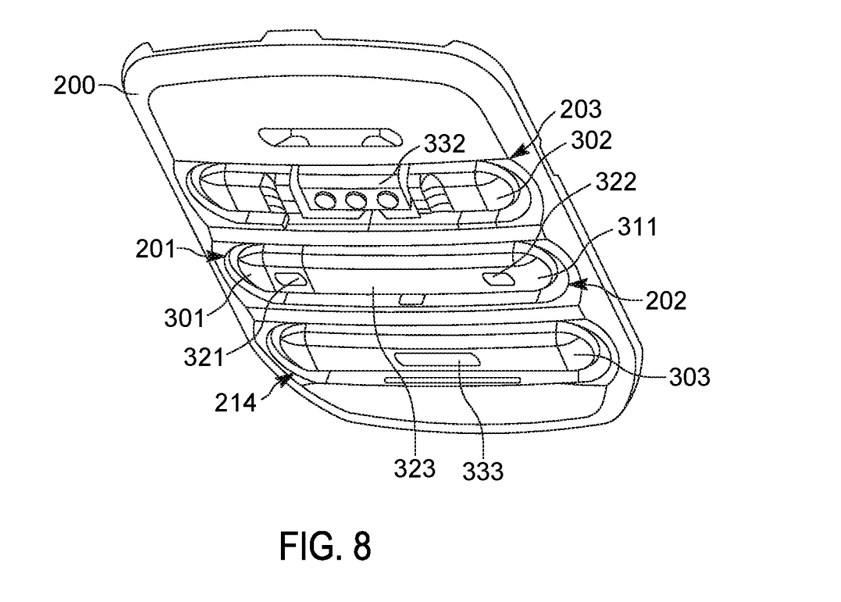
FIG. 8 depicts a perspective view of the bezel and the flexible substrate of the device of FIG. 1, in the assembled state, in accordance with some examples.
Figure 9:
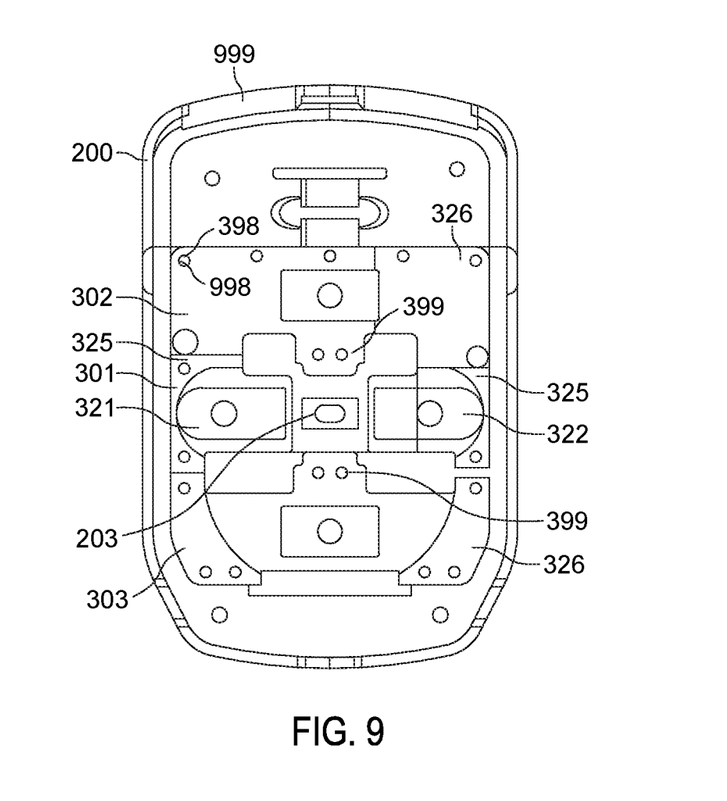
FIG. 9 depicts a rear view of the bezel and the flexible substrate of the device of FIG. 1, in an assembled state, in accordance with some examples.

Attention is next directed to FIG. 7, FIG. 8 and FIG. 9 which respectively depict front, perspective and rear views of the bezel 200 and the flexible substrate 300, in an assembled state. In particular, the distal end 311 of the arm 301 has been inserted through the second aperture 202 from the front-side of the bezel 200 and over the retention plate 203. Indeed, comparing, for example, FIG. 4, FIG. 6 and FIG. 8, it is understood that the distal end 311 of the arm 301 has been inserted through the first aperture 201 from the rear-side of the bezel 200, over the retention plate 203 (e.g. as depicted in FIG. 6, as compared to FIG. 4), and inserted through the second aperture 202 from a front-side of the bezel 200 (e.g. as depicted in FIG. 8, as compared to FIG. 6), such that the first button portion 321 and the second button portion 322 respectively mate with the first aperture 201 and the second aperture 202 from the rear-side of the bezel 200 (e.g. as best seen in FIG. 9), and the non-button portion 323 resides against the retention plate 203 from the front-side of the bezel 200 9 (e.g. as best seen in FIG. 7 and FIG. 8). Hence, 4, FIG. 6 and FIG. 8 show a weaving pattern and/or an over-and-under motion used to assemble the arm 301 with the apertures 201, 202 and the retention plate 203.

As also seen in FIG. 7 and FIG. 8, the button portions 332, 333 extend through the respective apertures 213, 214 in the assembled state.

Furthermore, as best seen in FIG. 9, rims 325, 326 of the arms 301, 302, 303 reside against a rear-side of the bezel 200 in the assembled state. Hence, for example, when the distal end 311 of the arm 301 is inserted through the second aperture 202 from the front-side of the bezel 200 and over the retention plate 203, the rim 325 of the second button portion 322 are also inserted through the second aperture 202, to reside against the rear-side of the bezel 200.

The rims 325, 326 may provide at least partial environmental protection for the device 100 as the rims residing against a rear-side of the bezel 200 may assist with keeping moisture, and the like, out of the device 100.

FIG. 9 further depicts an example of a hole 398 being around a post 998; as the holes 398 are generally positioned at the rims 325, 326 and the tabs 399, the holes 398 around the posts 998 may assist with holding the rims 325, 326 against the rear-side of the bezel 200.

Also best seen in FIG. 9, the first button portion 321 and the second button portion 322 are separated by the retention plate 203 at a rear-side of the bezel 200 such that the retention plate 203 provides a clear tactile separation between the buttons 103-1, 103-2 (e.g. corresponding to the first button portion 321 and the second button portion 322) when a user attempts to actuate one or the other of the buttons 103-1, 103-2.

FIG. 9 further depicts latches 999, and the like, at a rear-side of the bezel 200 which may used to attach the keypad 101 and/or the bezel 200 to the device 100, though any suitable mechanism for doing so is within the scope of the present specification.

Hence, provided herein is a device with a keypad that includes a bezel assembled with a flexible substrate. Such keypad may obviate the use of overmold manufacturing techniques and/or liquid silicon injection molding manufacturing techniques used to form prior art keypads. In particular while overmold manufacturing techniques may be used to form a keypad, the thermoplastic polyurethane used in overmold manufacturing techniques may cause poor tactility in the resulting keypads. Furthermore, liquid silicone injection molding manufacturing techniques have high tooling costs and may have poor yields. Hence, the presently provided device and/or keypad, which may use a rubber keypad without silicone, may be generally cost effective and/or have higher yields and/or easy to assemble, and further may provide an improved user interface to a device, as compared to some prior art keypads. Indeed, the presently provided device and/or keypad may be particularly advantageous for use with body wearable devices, such as a shoulder mountable remote speaker microphone (and/or radio speaker microphone), by facilitating the ability for a user to tactilely detect button positions without having to directly view the presently provided device and/or keypad. Such body wearable devices are often worn attached to a pocket or epaulette of public safety personnel. Hence, the presently provided device and/or keypad may provide a user interface that is easy to access and intuitive to locate buttons, and may be particularly advantageous when deployed public safety environments where a user is unable to directly view a device.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
    a bezel comprising: a first aperture and a second aperture separated by a retention plate; and
    a flexible substrate comprising two or more arms joined at joining ends, and separated at distal ends, distal from the joining ends,
    at least one arm, of the two or more arms, comprising: a first button portion and a second button portion configured to respectively mate with the first aperture and the second aperture at a rear-side of the bezel, the first button portion and the second button portion separated by a non-button portion,
    a respective distal end of the at least one arm configured for: insertion through the first aperture from the rear-side of the bezel, over the retention plate, and insertion through the second aperture from a front-side of the bezel, such that the first button portion and the second button portion respectively mate with the first aperture and the second aperture at the rear-side of the bezel, and the non-button portion resides against the retention plate from the front-side of the bezel, and
    remaining arms, of the two or more arms, configured to mate with the bezel at the rear-side.

2. The device of claim 1, further comprising a retention mechanism for retaining the non-button portion against the retention plate.

3. The device of claim 1, wherein the retention plate is rigid.

4. The device of claim 1, further comprising one or more retention mechanisms for retaining the two or more arms at the rear-side of the bezel.

5. The device of claim 1, wherein the at least one arm comprises respective rims around respective sections of the first button portion and the second button portion, the respective rims configured to reside against the rear-side of the bezel when the first button portion and the second button portion respectively mate with the first aperture and the second aperture from the rear-side of the bezel.

6. The device of claim 1, further comprising:
rims around at least a portion of the two or more arms; and
one or more retention mechanisms for retaining the rims at the rear-side of the bezel.

7. The device of claim 1, wherein the bezel further comprises further apertures in a one-to-one relationship with the remaining arms, the remaining arms comprising respective button portions configured to mate with respective apertures, of the further apertures, at the rear-side of the bezel.

8. The device of claim 1, wherein the two or more arms comprises three arms joined at the joining ends, and separated at the distal ends, such that the flexible substrate has an "E" shape.

9. The device of claim 1, wherein the first button portion and the second button portion comprise respective protrusions extending from a front surface thereof, indicative of respective button positions.

10. The device of claim 1, wherein a front surface of the at least one arm comprises a continuous surface across the first button portion, the non-button portion and the second button portion.

11. The device of claim 1, wherein at least one of the remaining arms has same configuration as the at least one arm, and the bezel comprises respective apertures for a respective first button portion and a respective second button portion, separated by a respective retention plate, for mating with the at least one of the remaining arms.

12. The device of claim 1, further comprising a portable communication device.

13. The device of claim 1, further comprising a remote speaker microphone.

14. The device of claim 1, further comprising a keypad formed by the bezel and the flexible substrate.

15. The device of claim 1, wherein the flexible substrate comprises rubber.

16. The device of claim 1, wherein the flexible substrate comprises rubber without silicone.

17. The device of claim 1, wherein the retention plate provides a tactile separation between a first button and a second button respectively corresponding to the first button portion and the second button portion.

18. The device of claim 1, further comprising a body wearable device.

19. The device of claim 1, further comprising a shoulder mountable body wearable device.

* * * * *